(12) United States Patent
Putz

(10) Patent No.: US 11,472,288 B2
(45) Date of Patent: Oct. 18, 2022

(54) VEHICLE-SIDE AND ACCESSORY-SIDE POWER TAKE-OFF SHAFT CONNECTING DEVICE AND POWER TAKE-OFF SHAFT CONNECTING UNIT COMPRISING THE TWO POWER TAKE-OFF SHAFT CONNECTING DEVICES

(71) Applicant: SYN TRAC GmbH, Bad Goisern (AT)

(72) Inventor: Stefan Putz, Bad Goisern (AT)

(73) Assignee: SYN TRAC GMBH, Bad Goisern (AT)

( * ) Notice: Subject to any disclaimer, the term of this patent is extended or adjusted under 35 U.S.C. 154(b) by 138 days.

(21) Appl. No.: 16/870,585

(22) Filed: May 8, 2020

(65) Prior Publication Data

US 2020/0269687 A1  Aug. 27, 2020

Related U.S. Application Data

(63) Continuation of application No. PCT/EP2018/080820, filed on Nov. 9, 2018.

(30) Foreign Application Priority Data

Nov. 10, 2017 (DE) .......................... 102017126482.5

(51) Int. Cl.
  *B60K 25/06* (2006.01)
  *A01B 71/06* (2006.01)
(52) U.S. Cl.
  CPC ............ *B60K 25/06* (2013.01); *A01B 71/063* (2013.01)
(58) Field of Classification Search
  CPC ............................... B60K 25/06; A01B 71/063
  See application file for complete search history.

(56) References Cited

U.S. PATENT DOCUMENTS

| 5,667,330 A | * | 9/1997 | Henkel | F16D 1/116 |
| | | | | 403/328 |
| 6,286,987 B1 | * | 9/2001 | Goode | B28C 5/4206 |
| | | | | 123/352 |
| 9,033,074 B1 | | 5/2015 | Gates | |
| 9,752,624 B2 | * | 9/2017 | Huegerich | F16D 1/10 |
| 2015/0367728 A1 | * | 12/2015 | Neumann | B60K 25/06 |
| | | | | 74/15.6 |
| 2020/0267888 A1 | * | 8/2020 | Putz | A01B 76/00 |

(Continued)

FOREIGN PATENT DOCUMENTS

| DE | 4132889 A1 | 4/1992 | | |
| DE | 112007003048 T5 | * | 10/2009 | ............. A62C 27/00 |
| EP | 3011816 A1 | 4/2016 | | |

(Continued)

OTHER PUBLICATIONS

International Search Report and Written Opinion for International Application No. PCT/EP2018/080820 dated Feb. 25, 2019.

*Primary Examiner* — Faye M Fleming
(74) *Attorney, Agent, or Firm* — Stephen J. Kenny; Vincenzo DiMonaco; Foley Hoag LLP

(57) ABSTRACT

According to the invention, PTO connecting apparatus is provided. According to the invention, this comprises a vehicle PTO connecting device from which an accessory equipment PTO connecting device according to the invention is releasable and nonpositively connectable and couplable.

19 Claims, 9 Drawing Sheets

(56) References Cited

U.S. PATENT DOCUMENTS

2020/0269687 A1    8/2020    Putz

FOREIGN PATENT DOCUMENTS

| | | | |
|---|---|---|---|
| JP | S57-084120 | 5/1982 | |
| JP | H01-300810 A | 12/1989 | |
| JP | H10-231846 | 9/1998 | |
| JP | 2002-104233 A | 4/2002 | |
| JP | 2020-544138 | 5/2019 | |
| WO | WO-9002481 A1 | 3/1990 | |
| WO | WO-2019/092207 A1 | 5/2019 | |
| WO | WO-2020167544 A1 * | 8/2020 | ............ B60K 25/00 |
| WO | WO-2021131249 A1 * | 7/2021 | ............ B60K 25/06 |

* cited by examiner

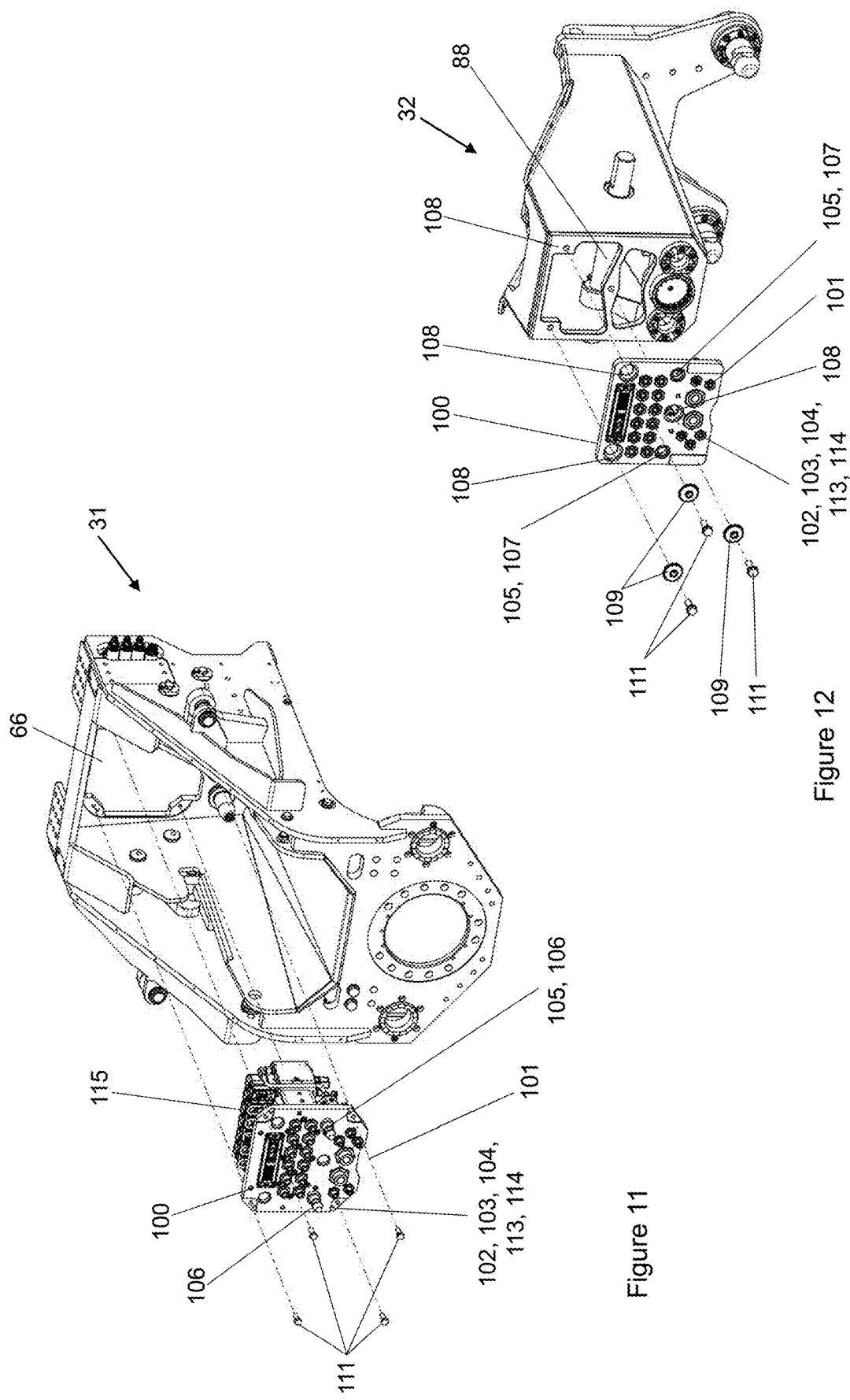

VEHICLE-SIDE AND ACCESSORY-SIDE POWER TAKE-OFF SHAFT CONNECTING DEVICE AND POWER TAKE-OFF SHAFT CONNECTING UNIT COMPRISING THE TWO POWER TAKE-OFF SHAFT CONNECTING DEVICES

CROSS-REFERENCE TO RELATED APPLICATIONS

This application is a Continuation of and claims the benefit of priority under 35 USC 120 to PCT/EP2018/080820 filed Nov. 9, 2018, which claims priority to DE 10 2017 126 482.5 filed Nov. 10, 2017, the entire contents of each are hereby incorporated by reference.

The present invention concerns a PTO connecting device on a vehicle and attachment and PTO connecting equipment with these two PTO connecting devices. An auxiliary drive, also known as a PTO (or using the abbreviation of the English term, PTO), provides a usually connectable mechanical drive source on an auxiliary outlet of the gearbox mainly on tractors as well as on lorries and some commercial vehicles. The mechanical drive power can be driven directly by means of a cardan shaft or in-built accessory equipment, such as reciprocating finger bar movers, belt drives or hydraulic pumps.

In modern tractors, the PTO shaft is located centrally between the three-point linkage at the back, or, in the case of models with a front attachment option, at the front also. If the devices are to be driven from a stationary vehicle, the speed of the engine is easy to control with the foot pedal or hand accelerator and, in so doing, to regulate the speed of the PTO (cable winches, irrigation pumps). This is known as direct drive. Often, this auxiliary drive is used on council vehicles which are used for street cleaning, scattering salt and snow removal.

In the case of tractors, the auxiliary drive is known as the PTO and serves to drive water pumps, mowing machines, loading vehicles and many other agricultural attachments. The PTO is also used in forestry, such as with modern wood splitting devices.

A propeller shaft with a splined or involute toothed cardan shaft is attached to the profiled shaft end protruding out of the gearbox. Securing this shaft is done earlier by means of a spring-pressured securing pin which engages in a surrounding groove on the end of the PTO shaft. With the publication of DIN EN 12965 in 2005, sliding pin interlocks are forbidden on the tractor side and must be replaced with rotationally symmetrical interlocks in the event of a repair or an exchange. In all conventional types of interlock, the cardan shaft can be removed without the need for tools. The common shape of the profiles of PTO shafts is the 1⅜ inch and 1¾ inch PTO profile with six "teeth", the 1⅜ inch PTO profile with 21 teeth and the 1¾ inch PTO profile with 20 teeth (involute profile).

An auxiliary drive is also used in the case of lorries, commercial vehicles and tractors as a secondary drive. In most cases, this is a hydraulic pump which drives small oil engines by means of hose lines or provides lifting cylinders with power. The attachment of angular gears and belt drives are common on tractors. This is called an indirect drive.

The following types of PTO (power take off) are known. A motorised PTO is generally connected directly to the engine via a special coupling or double coupling and runs, therefore, at a normal speed (see below) depending on the speed of the engine. It is thereby possible to stop or start the towing machine when an auxiliary device continues to run.

With certain harvesting machines, such as balers, self binders or towed combine harvesters, overloads can happen, often making it necessary to free up the stoppage manually.

A geared PTO is connected to the engine by the driving clutch and a gearbox wherein the nominal speeds are standardised. Both standard speeds of 540/min and 1000/min are reduced so that they are achieved within the range of the nominal speed of the engine (maximum power). For some time, speeds known also as 540E and 1000E (economy) have existed, wherein the nominal speed of the PTO is reached with a reduced engine speed, mostly in the regions of the maximum engine torque at about 1400 to 1600/min. Therefore, it is possible to operate devices while saving fuel with less power consumption.

The torque of a directional PTO depends on the vehicle gearbox. Thus, its speed and often the rotational direction also depend on the selected gear as well as on the speed. In the same way as the geared PTO, the latter stops when the driving clutch is disengaged. This PTO is used, for example, for trailers with driven axles. The pulling force is improved, therefore, in difficult countryside, and it avoids getting stuck.

A coupling frame for agricultural machines is known from DE 602 09 396 T2, wherein the coupling frame has a driven unit with a power drive, an output shaft and an operating unit with an input shaft, wherein a splined coupling is provided to couple together the input and output shafts at an angle, wherein the input and output shafts are connected together by a separate actuating step.

A geared unit with a counter shaft is known from DE 35 09 095 A1, wherein the geared unit has parallel input and output shafts which are mounted in a housing, wherein the input shaft is mounted in the counter shaft of a gearbox and the housing of the unit is fastened to the gearbox housing. An input gear can slide on the input shaft at an angle adjacent to its mounted end. Furthermore, the input shaft carries an input sprocket. An output gearwheel is mounted to rotate on the output shaft so that it engages with the input gearwheel and an output sprocket is coupled with the input sprocket via a chain drive. By using a coupling on the output shaft, the output gearwheel or the output sprocket is coupled to the output chain variably, while the input gearwheel has a coupling part and can slide on the counter shaft to engage with a coupling member in order to couple it with the input shaft of the unit.

A coupling part is known from AT 51 4147 B1, which is formed from a cup-shaped counter coupling part and a corresponding slot wherein these two components can be pulled into each other mechanically to connect an agricultural vehicle to an attachment device. After mechanically connecting this coupling device, in a subsequent step, electronic, electrical or hydraulic connections can be made wherein, after the mechanical coupling of the vehicles or of the vehicle and an accessory device, subsequently PTOs are then moved axially with further actuation and are connected together.

SUMMARY OF THE DISCLOSED SUBJECT MATTER

The task of the present invention is to provide a safe and reliable PTO connecting apparatus usable for different types of drive which can be coupled together in a fast and simple manner. A further task is to create PTO connecting devices for a vehicle or for accessory equipment with which a PTO connection can be produced in a faster and more reliable manner. It is a further task to create a method for producing, easily and securely, a PTO connection between a vehicle and accessory equipment or an additional axle.

PTO connecting apparatus to couple a PTO drive of a vehicle with a PTO drive of an accessory equipment item, wherein a vehicle PTO connecting device with a releasable nonpositively connectable and couplable attachment PTO connecting device are present wherein mechanical coupling elements are provided on the vehicle and mechanical counter coupling elements, corresponding to them, are present on accessory equipment which can slide into each other and can interlock, characterised in that the vehicle PTO connecting device and the accessory equipment PTO connecting device are each secured axially to the vehicle or to the accessory equipment, or, respectively, the coupling unit of the vehicle and the coupling unit of the accessory equipment, so that, when the vehicle and the accessory equipment are mechanically attached, the PTO connecting devices must necessarily be coupled together.

PTO connecting apparatus according to claim 1, characterised in that the PTO connecting apparatus comprises a coupling shaft (153) with a coupling side, which comprises outer gear teeth designed with flank clearance and additionally a coupling hub (177) as a corresponding PTO connecting device (152) which has inner gear teeth designed with flank clearance on a coupling side, and is designed to correspond to the outer gear teeth of the coupling shaft (153).

A PTO connecting apparatus according to the invention comprises a vehicle PTO connecting device according to the invention and an accessory equipment PTO connecting device according to the invention that is releasable and nonpositively connectable and couplable. These are designed so that, when coupling vehicle and accessory equipment, the PTO is automatically coupled without additional actuation. Also, the PTO connecting apparatus is axially connected to the vehicle or the accessory equipment or to a couplable supplementary axle, or to the coupling and counter coupling elements of a vehicle and of accessory equipment item or of a supplementary axle.

The vehicle PTO connecting device according to the invention comprises a coupling shaft, a bearing shaft connected to it and a bearing seat, wherein the coupling shaft has outer gear teeth designed with flank clearance designed on one coupling side, and wherein the bearing shaft in the bearing seat can swivel by means of a bearing device and an approximately circular shoulder is formed in the bearing seat forming an axial stop for the coupling shaft, wherein the bearing seat has a stop plate at a vehicle end, and a vehicle end of the coupling shaft has a cup-shaped recess with inner gear teeth and has, on a coupling end of the bearing shaft, correspondingly designed outer gear teeth to form an antirotational lock and wherein coupling shaft and bearing shaft are connected together by means of screw fastenings.

At least one disc spring washer, sold under the trademark BELLEVILLE™, can be arranged between bearing device and stop plate. The attachment PTO connecting device comprises a designed coupling hub and a bearing seat, wherein the coupling hub has internal gear teeth on a coupling side designed with flank clearance wherein said hub is designed corresponding to the outer gear teeth of the coupling shaft, and wherein the coupling hub on the attachment has a cylindrical bearing section which is able to swivel in the bearing seat by means of a bearing device and an approximately circular shoulder is formed in the bearing seat, forming an axial stop for the coupling hub wherein the bearing seat has a stop wall at one end of the accessory equipment. At least one disc spring washer, sold under the trademark BELLEVILLE™, can be arranged between the bearing device and stop wall.

The vehicle end of the bearing shaft can have a radially surrounding set of gear teeth designed with a small amount of clearance. Furthermore, a spacer shaft can be provided which can be connected to the bearing shaft. At its coupling end, the spacer shaft also has a radially surrounding set of gear teeth designed with a small amount of clearance. In the bearing shaft, a centring recess extending in a axial direction to receive a centring pin can be formed on the vehicle end. The spacer shaft can have the corresponding centring pin at its coupling end. Furthermore, a connecting bushing can be provided to the couple bearing shaft and spacer shaft which has inner gear teeth corresponding to the outer gear teeth of the bearing shaft and the spacer shaft.

Centring pins and centring recesses can also be arranged in the opposite manner. Bearing shaft and spacer shaft can be connected together via the corresponding outer gear teeth and the corresponding inner gear teeth by means of the connecting bushing. The centring in the axial direction, so that it is not out of balance, is created by means of the centring pins and the centring recesses. The spacer shaft can secured by means of appropriate securing devices, such as by retaining rings, sold under the trademark SEEGER™, with the bearing shaft and the spacer shaft. Preferably, the spacer shaft is designed to produce a connection between the coupling shaft and a PTO coupling in a vehicle gearbox.

A docking receptacle is positioned over a large (diameter approx. 258 mm) hole, mechanically machined in the first plate on a centring shoulder on the central tubular flange of the central axis section. This precision enables a spacer shaft with gear-toothed sleeves to be used coupling the PTO drive of the gearbox and the PTO coupler in the coupling direction or in a docking receptacle. Thus, an expensive and, above all, maintenance-free coupling using a cardan joint is not necessary.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 11: a perspective exploded drawing of a coupling plate and a docking receptacle,
and
FIG. 12: a perspective exploded drawing of a further coupling plate and a docking slot.

Figure 2:
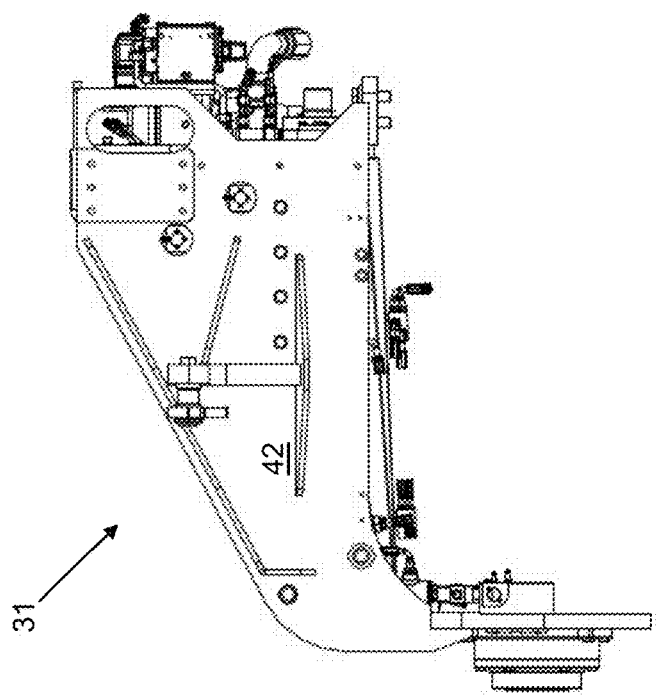
FIG. 2: a side view of the docking receptacle.
Figure 1:
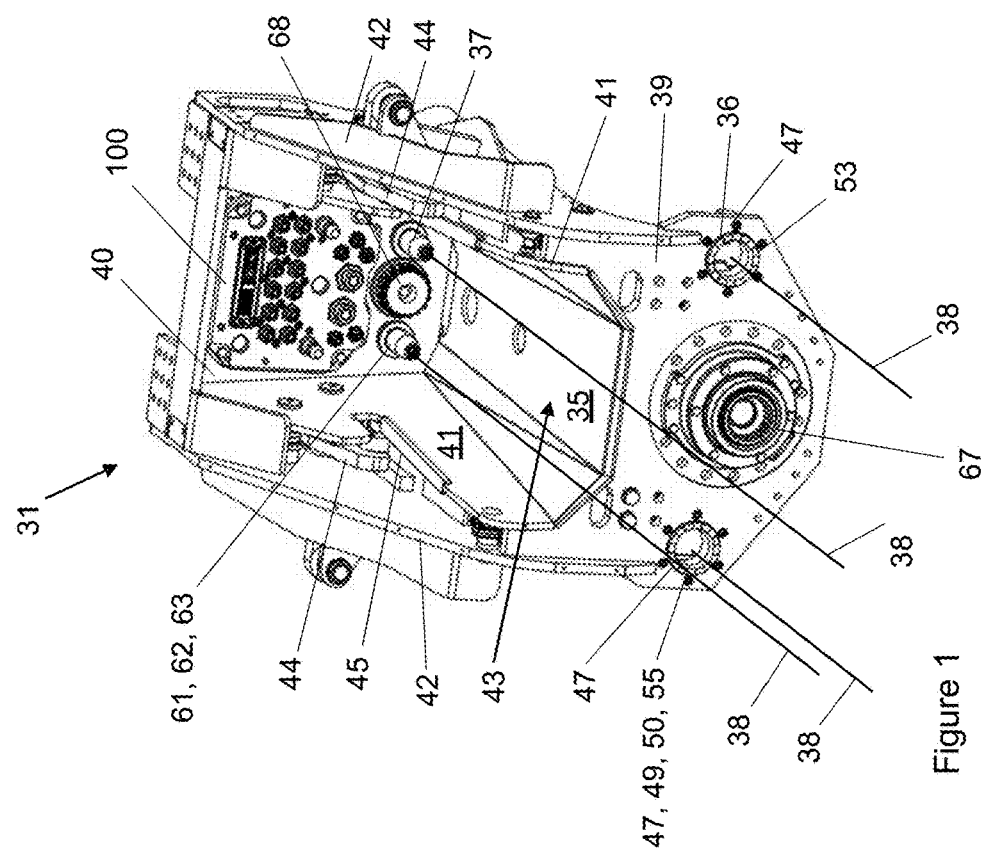
FIG. 1: a perspective view of a docking receptacle.
Figure 4:
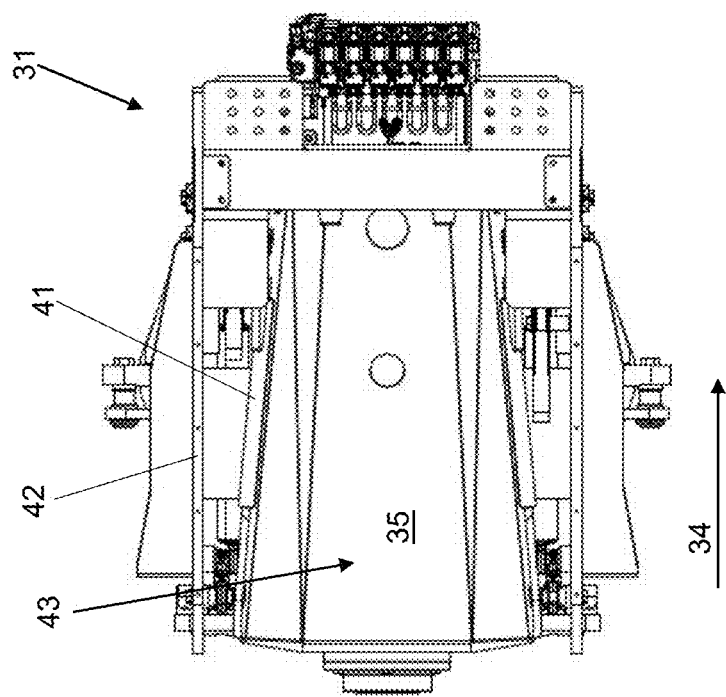
FIG. 4: a view from above over the docking receptacle.
Figure 3:
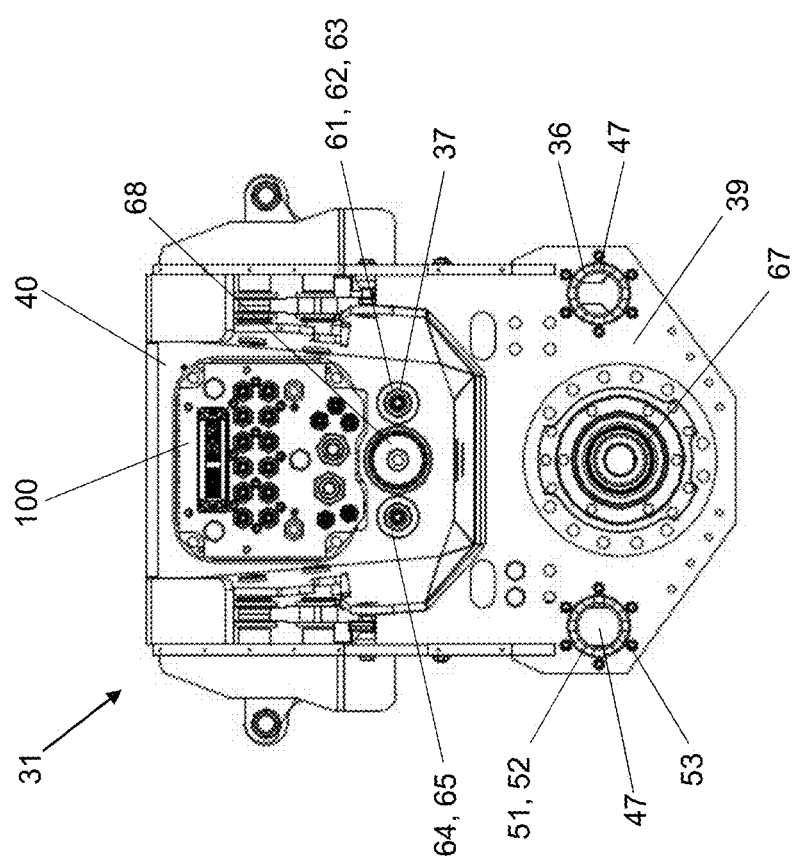
FIG. 3: a view from the front over the docking receptacle.
Figure 6:
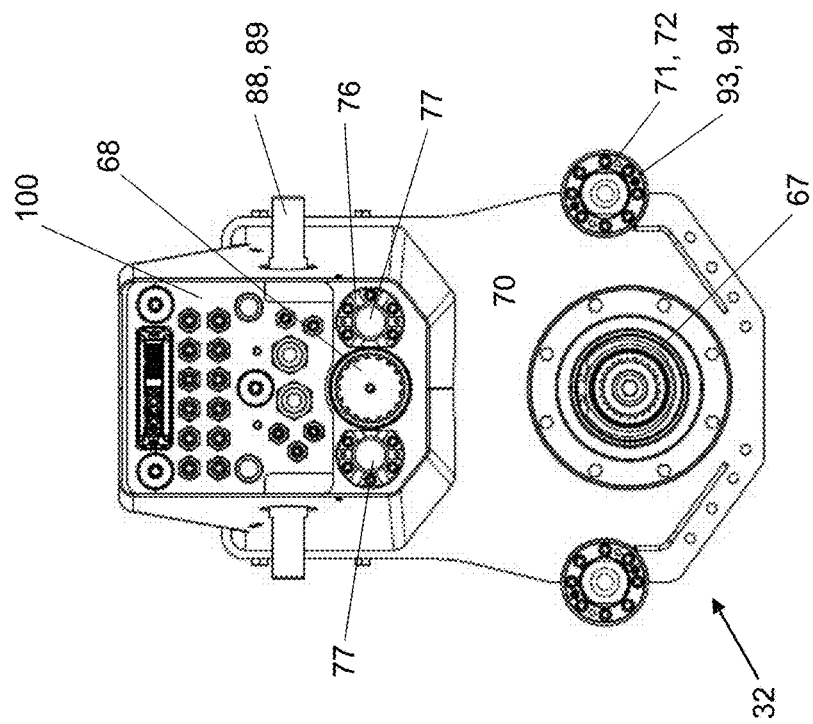
FIG. 6: a view from the front of the docking slot.
Figure 5:
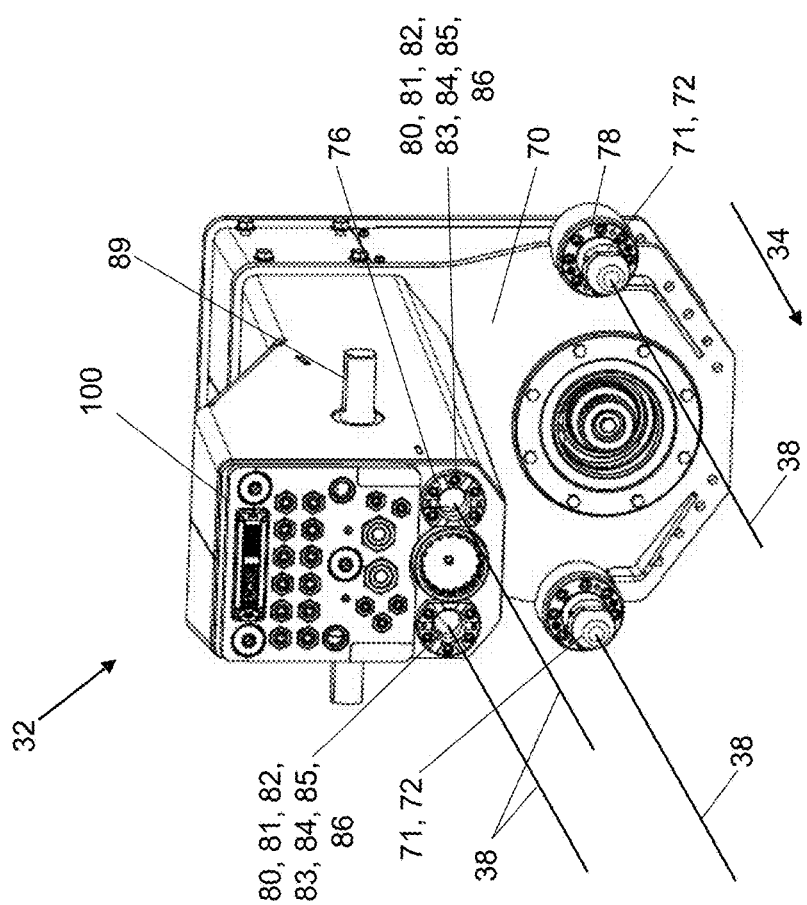
FIG. 5: a perspective illustration of a docking slot.
Figure 8:
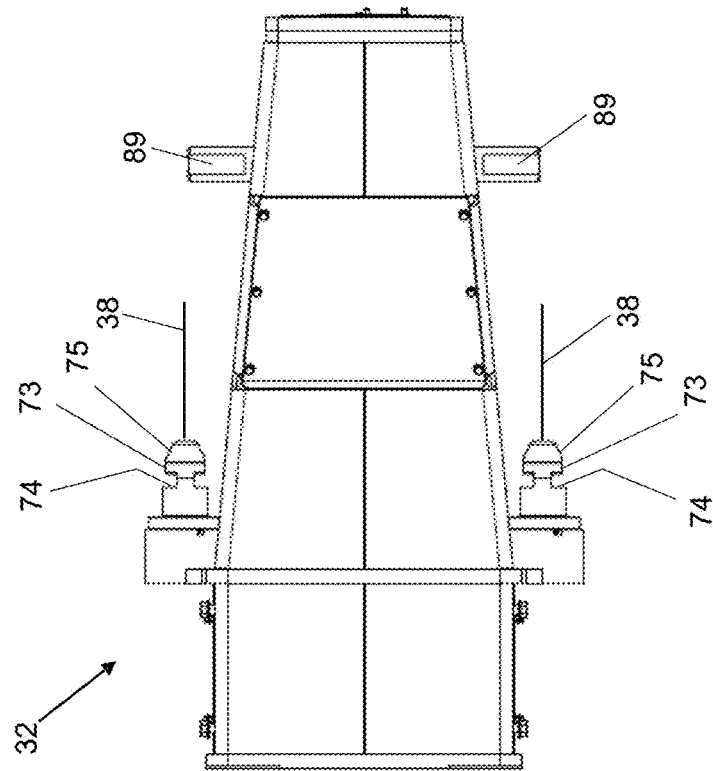
FIG. 8: a view from above of the docking slot.
Figure 7:
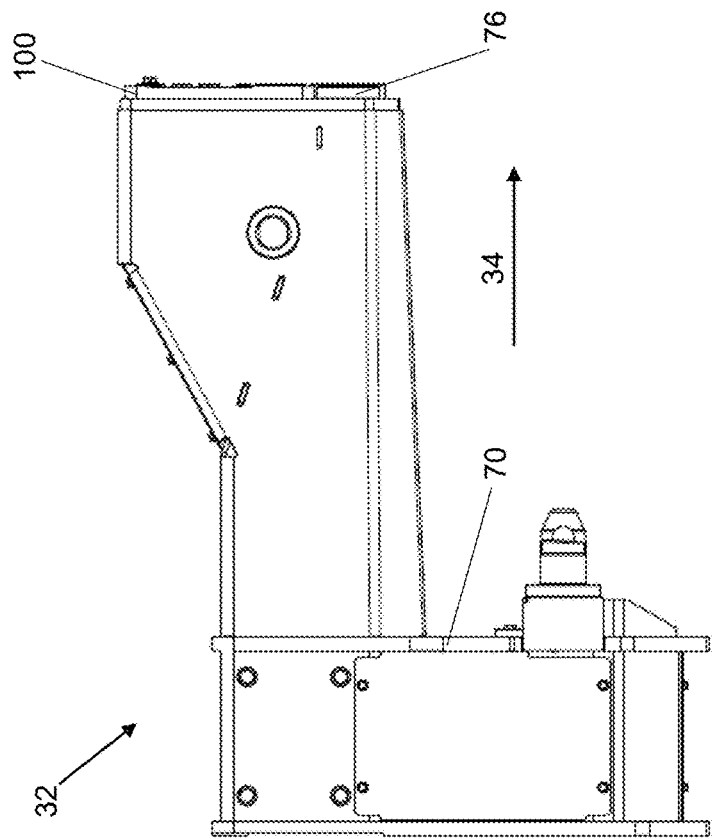
FIG. 7: a side view of the docking slot.
Figure 10:
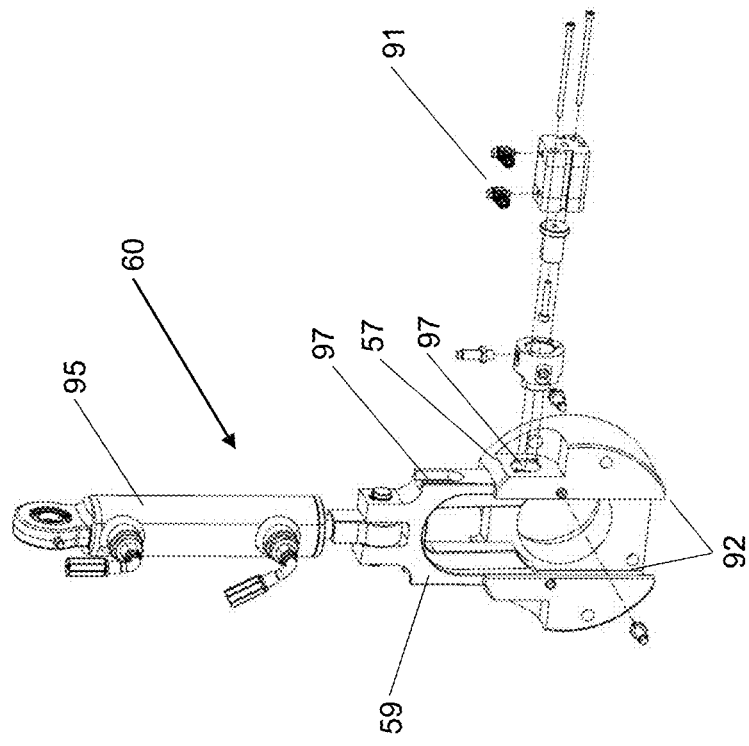
FIG. 10: a further partial perspective exploded view of the wedge for with hydraulic cylinder and the locking device.
Figure 9:
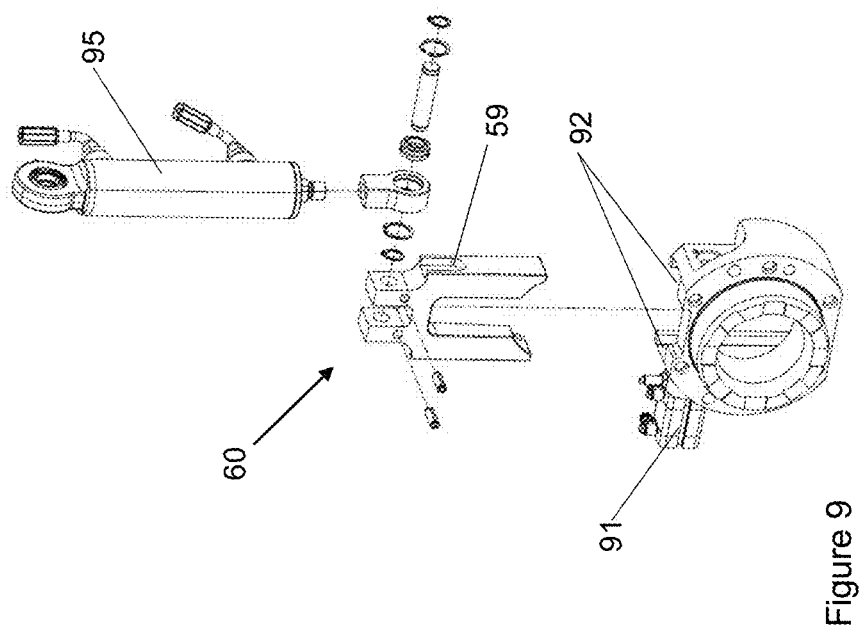
FIG. 9: a partial perspective exploded view of a wedge fork with hydraulic cylinder and a locking device.
Figure 13:
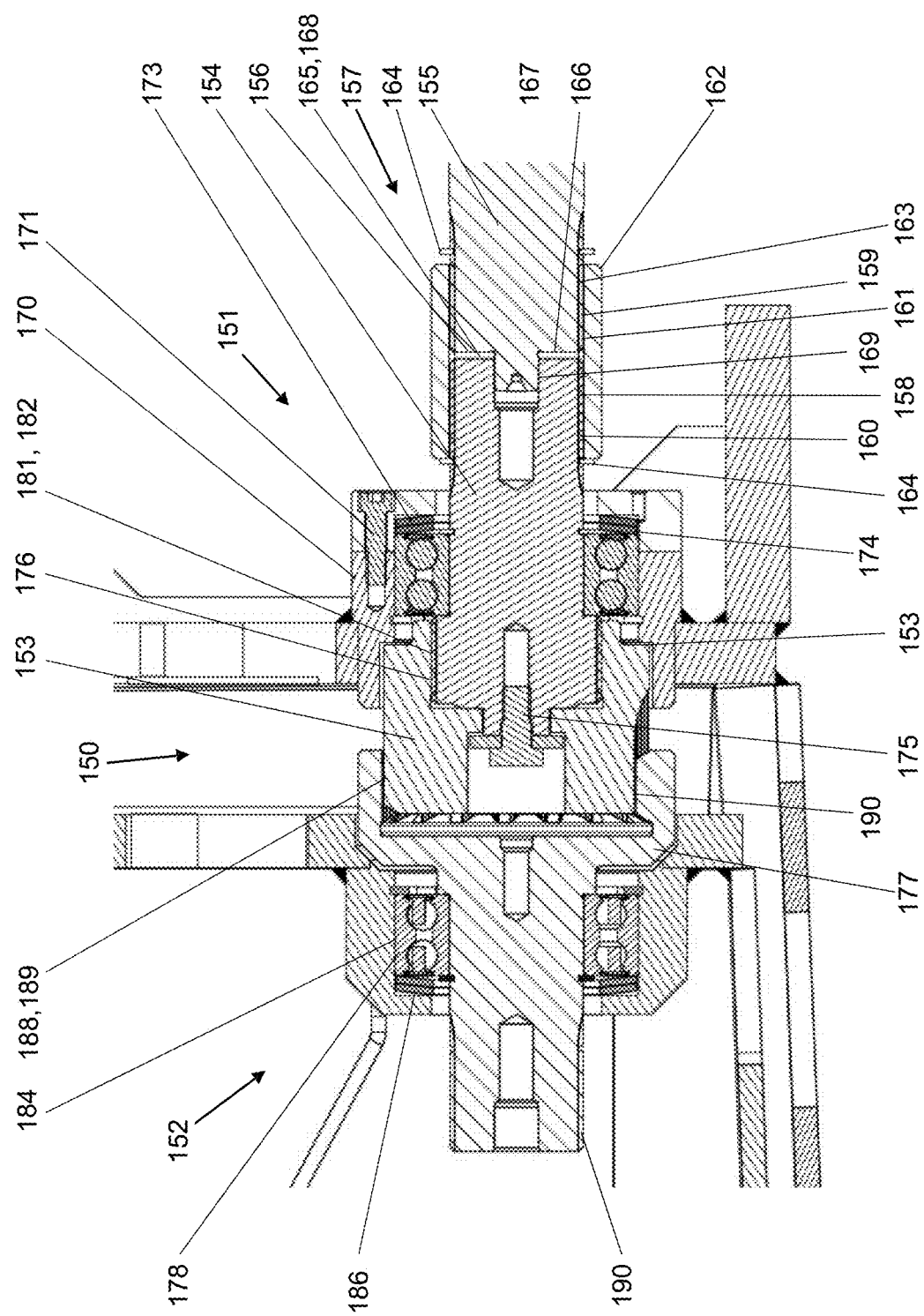
FIG. 13: a sectional side illustration of a PTO connecting apparatus according to the invention.
Figure 14:
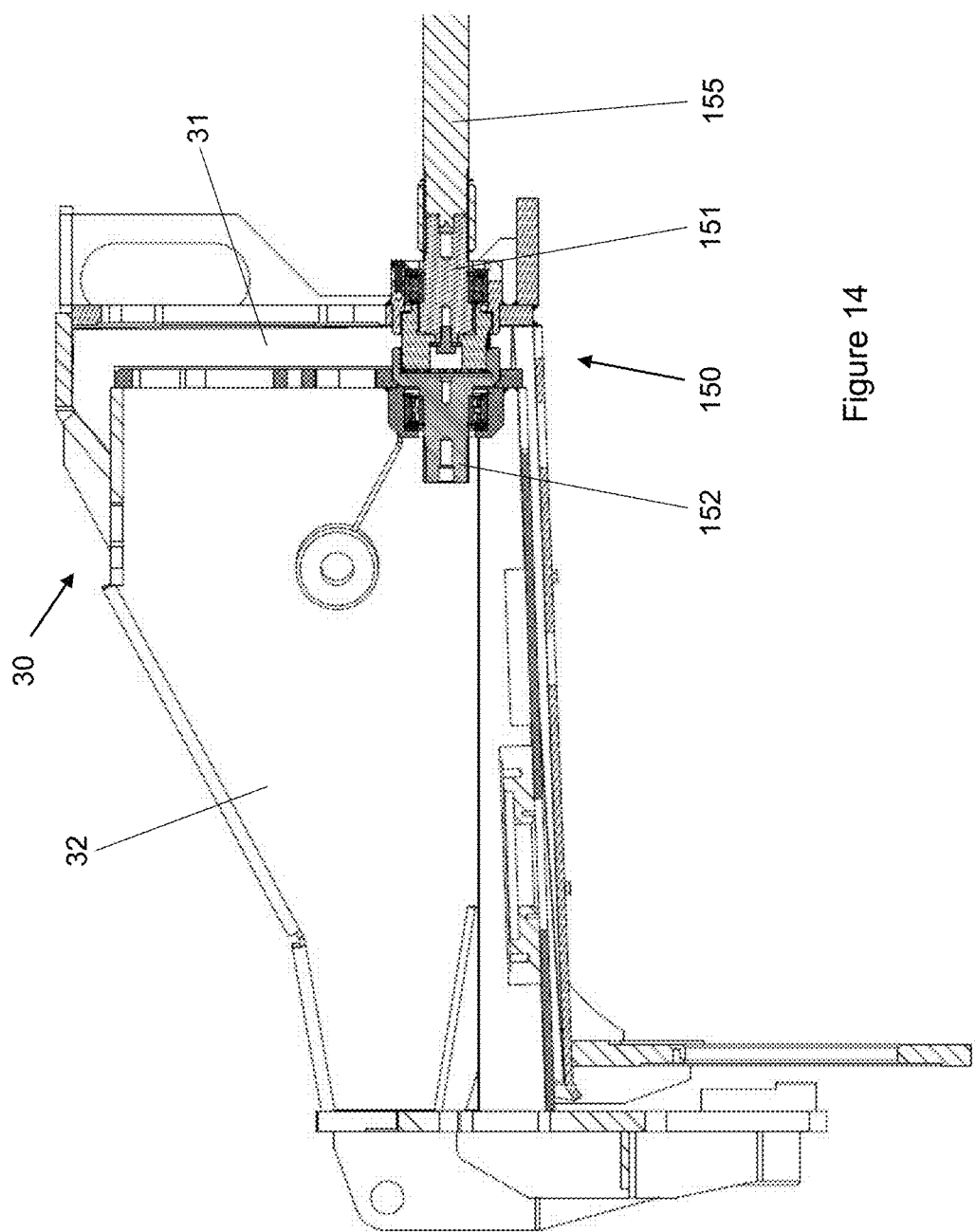
FIG. 14: a perspective exploded illustration of the PTO connecting apparatus.
Figure 15:
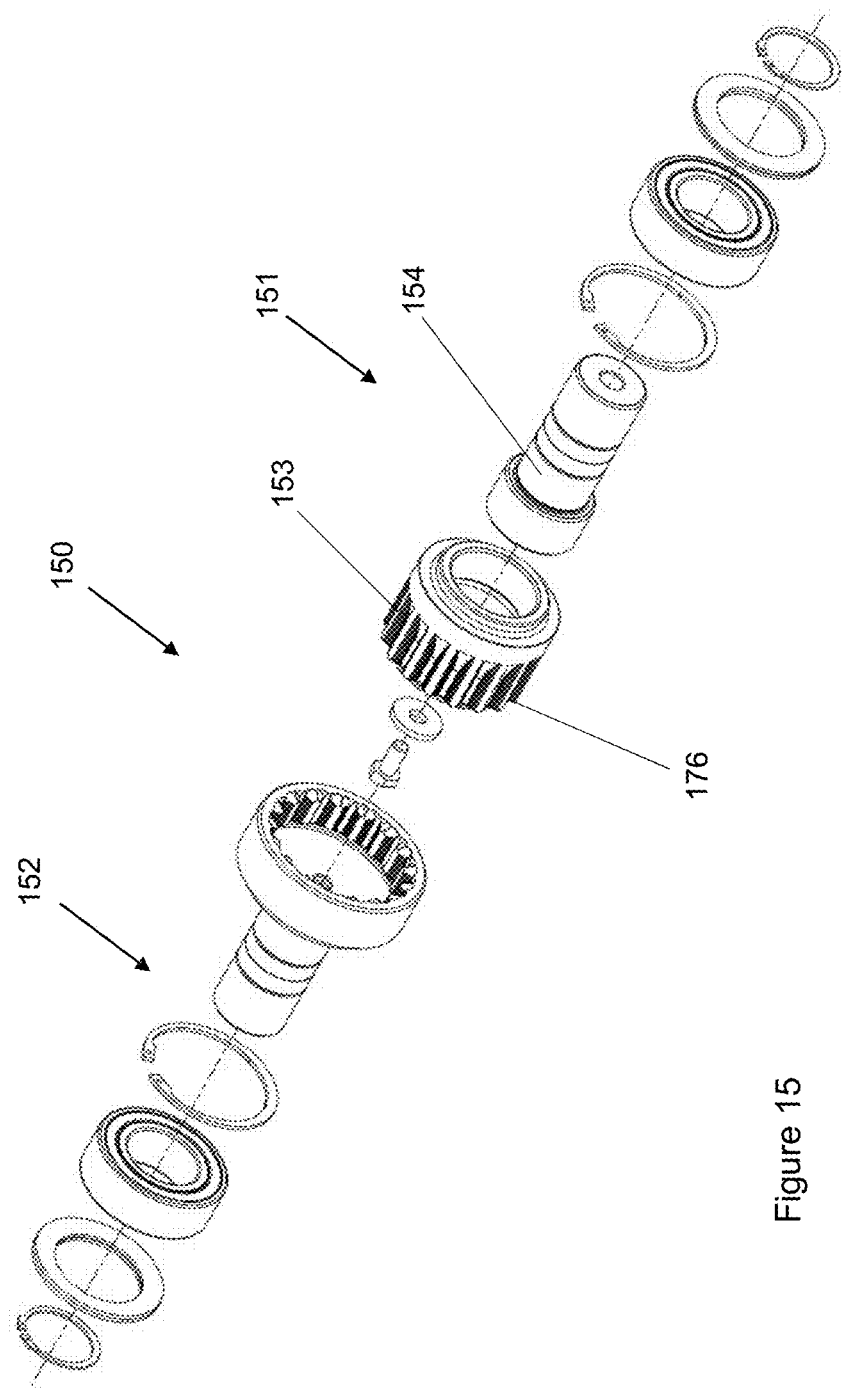
FIG. 15: a sectional side illustration of the coupling apparatus with a docking receptacle and a docking slot.

Below, a PTO connecting apparatus 150 according to the invention is explained, comprising a vehicle PTO connecting device 151 and an accessory equipment PTO connecting device 152, which is releasable, nonpositively connectable and couplable, using an embodiment example (FIGS. 13 to 15). On the vehicle, the PTO connecting device 151 comprises a coupling shaft 153, a bearing shaft 154 coupled to it and a spacer shaft 155. A vehicle end of the spacer shaft 156 is connected via a PTO coupling (not shown) to a vehicle gearbox (not shown). The spacer shaft 155 is connected to the bearing shaft 154. To connect spacer shaft 155 and bearing shaft 154, the spacer shaft 155 and the bearing shaft 154 have outer gear teeth 160, 161 in a connecting region 157 on their cover wall 158, 159.

In the area of these sets of gear teeth 160, 161, a correspondingly designed tubular sleeve 162 is provided which has corresponding inner gear teeth 163. The connecting sleeve 162 is connected by means of corresponding retaining rings, sold under the trademark SEEGER™, 164 against axial shifting, sliding both with the bearing shaft 154 as well as with the spacer shaft 155. Furthermore, the spacer shaft 155 can have a front face 166 with centring pin 167 extending in a longitudinal direction on its coupling or connecting end 165, wherein the bearing shaft 154 has a correspondingly designed centring recess 169 corresponding to its vehicle end 168. A docking receptacle 31, seat explained later, has a corresponding bearing seat 170 to house the bearing shaft 154. This bearing is a component part of the vehicle PTO connecting device 151 and can be connected unreleasably to the docking receptacle by welded joints or releasably by corresponding screw fasteners. The bearing shaft 154 is accommodated and mounted in this bearing seat 170 by means of a bearing device 171, preferably a double race ball bearing.

At its vehicle end 172, the bearing seat 170 has a stop plate 173, wherein the bearing device 171 is mounted on the stop plate 173 by corresponding disc spring washers, sold under the trademark BELLEVILLE™, 174. The disc spring washers, sold under the trademark BELLEVILLE™, 174 are designed to protect the bearing device 171 from wear and damage during the process of coupling two PTO shafts.

The bearing shaft 154 is connected to the cup-shaped coupling shaft 153. The coupling shaft 153 is secured axially and connected by a central screw fastening 175 to the connecting end 165 of the bearing shaft 154. In the axial as well as in the radial direction, this securing device has a clearance which is larger than the flank clearance of a gear in the corresponding spline. Furthermore, the coupling shaft 153 has corresponding inner gear teeth 176.

Furthermore, on its vehicle end 179, the coupling shaft 153 has a recess 180 in which the bearing shaft 154 is mounted. For coupling, in this region the bearing shaft 154 has a corresponding set of outer gear teeth 181 and the coupling shaft 153 has a correspondingly designed set of inner gear teeth 182. The coupling shaft 153 forms a connection or coupling with a cup-shaped coupling hub 177 on the PTO connecting device 152 of accessory equipment. Like the coupling shaft 153, the coupling hub 177 is axially located in a corresponding bearing seat 178 in a docking slot of the accessory equipment. At the coupling end, the coupling shaft 153 has corresponding outer gear teeth 190 to connect the coupling shaft 153 with the inner gear teeth of the coupling hub 177. A radially surrounding shoulder 183 of the coupling shaft 153 forms a stop thereby, which is housed in the bearing seat 170 of the docking receptacle.

The coupling hub 177 is mounted to swivel in the bearing seat 178 of the accessory equipment PTO connecting device 152 by means of a bearing device 184, such as a double race deep groove ball bearing, wherein the bearing seat 178 forms an axial stop 185 of the coupling hub 177. Disc spring washers, sold under the trademark BELLEVILLE™, 186 are provided in the bearing seat 178 in the region between the bearing device 184 and the bearing seat 178 in order to protect the bearing device 184 from damage. At its connecting or coupling end 187, the coupling hub 177 has a cup-shaped receptacle 188 with inner gear teeth 189 to receive the outer gear teeth 190 of the coupling shaft 153. These are designed correspondingly.

The outer gear teeth of the coupling shaft (153) and the inner gear teeth of the coupling hub (177) are preferably designed such that the tooth systems, or teeth at the coupling front faces come into contact axially or are designed with sharply angled converging flanks so that the teeth each form locating channels for the corresponding gearing so that inner gear teeth, or outer gear teeth, can slide along on the sloping flanks or chamfering during coupling so that the gears rotate into each other and are able to slide with respect to each other.

Both gearing regions between coupling shaft and bearing shaft as well as between bearing shaft and spacer shaft have a small amount of clearance so that, in connecting the coupling hub and the coupling shaft, it is possible to have a lighter engagement between the corresponding teeth.

On the vehicle, the coupling shaft is arranged in a flank-centred spline with flank clearance on the bearing shaft and is secured by means of the screw fastening with a washer mentioned earlier. The gearing, produced when coupling the connection to the coupling hub, is produced as flank-centring outer gear teeth with flank clearance and the teeth are pointed. The pointing addresses the same technical task as that which is provided with gear selectors in synchronisations of manual gearboxes. The flank clearance in the splines and the clearance in the axial securing enable the coupling shaft to compensate for the alignment and angular errors that occur between docking receptacle and docking slot. The bearing is mounted with no clearance on the shaft. As explained above, the bearing is housed to slide in the bearing seat and is prestressed with springs.

With regard to attachment, the coupling hub has teeth to produce the connection to the coupling shaft when the coupling happens. This is carried out as flank-centred inner gear teeth wherein the teeth are also appropriately pointed. The bearing device is mounted on to the coupling hub with no clearance. The bearing device is able to slide in the bearing seat and is also prestressed with disc spring washers, sold under the trademark BELLEVILLE™. A description follows below of a method according to the invention to connect or couple the coupling shaft with the coupling hub.

In this, provision is made that the docking slot is pulled into the docking receptacle with the hydraulic collecting or arrestor hooks and is centred by the four pin/bushing fasteners of the first and second centring devices of the docking receptacle and of the docking slot. Once centring has been achieved, the coupling hub is shifted axially on to the coupling shaft. The pointed teeth on the coupling shaft and hub ensure that such the shafts rotate in the coupled state and the coupling hub slides on to the coupling shaft.

If the gear teeth do not align sufficiently by themselves because there is a tooth-on-tooth situation, it is possible, by means of the PTO connecting device according to the invention, that both coupling hub as well as shaft axial can be moved against the disc spring washers, sold under the trademark BELLEVILLE™, up to the corresponding stop. If the coupling process cannot be completed successfully, a signal is issued that the control contacts have not been made in an electrical coupling. A corresponding message is given to the operator. The docking slot has to be pushed out manually. The shaft is rotated by actuating the PTO coupling for a few moments and the coupling attempt is begun again. The spring force is designed such that damage to the bearing by the force of the drawing hook is avoided safely and reliably The connection by means of the PTO device according to the invention is done, therefore, at the same time as the connection explained above of the docking slot with the docking receptacle. A coupling system is described in the following (FIGS. 3 to 14). Below, a docking receptacle 31 of a docking device 30 (coupling device) to accommodate a docking slot 32 (coupling device) is described by means of an embodiment example. The docking receptacle 31 comprises an approximately U-shaped pre-centring device 33 with an approximately conically tapering insertion lead-in 35 in an insertion direction 34 for pre-centring a docking slot 32 designed to correspond with the docking receptacle.

Furthermore, at least a first and a second centring device 36, 37 are provided on the docking receptacle 31, wherein the first and second centring device 36, 37 each comprise two coupling elements and/or counter coupling elements to connect with corresponding coupling elements and/or counter coupling elements of a docking slot 32. Furthermore, the first and the second centring device 36, 37 are designed to centre the docking slot 32 in the insertion direction 34 in relation to the docking receptacle 31 along four centring axes 38 corresponding to the four coupling or counter coupling elements. Also, the docking receptacle 31 comprises a retraction device with two hydraulically operated arrestor hooks 44 to draw the docking slot 32 into the docking receptacle 31 in the insertion direction 34. The docking receptacle 31 comprises two docking walls 39, 40 extending in a vertical direction and offset from one another in a horizontal direction. These two docking walls 39, 40 are connected together by means of an insertion lead-in 35 extending in an approximately horizontal direction. Accordingly, a first docking wall 39 is arranged in a vertical direction in the region below the insertion lead-in 35 and a second docking wall is arranged to limit the insertion lead-in 35 in the horizontal direction above the insertion lead-in 35.

The insertion lead-in undertakes the pre-centring task during the insertion of a docking slot into the docking receptacle by receiving a body of the docking slot 32 designed to correspond to the insertion lead-in 35. In order to pre-centre the docking slot 32 when inserting into the docking receptacle 31, the geometry of the insertion lead-in 35 tapers in the insertion direction 34 to enable pre-centring of the docking slot. On both sides of the insertion lead-in 35, inner and outer side walls 41, 42 extending in a vertical direction are provided approximately transverse to the insertion direction 34. These inner and outer side walls 41, 42 are arranged at a predetermined angle in the insertion direction 34 such that a receptacle space 43, delimited by the inner side walls 41 and the insertion lead-in 35, tapers in the insertion direction.

In the inner side walls 41, catch pin guides 45 are formed for the guidance and receipt of corresponding catch pins provided on a docking slot 32. In the inner and outer side walls 41, 42, shafts are arranged in corresponding holes on which the arrestor hooks 44 are pivoted. Thus, the arrestor hooks are arranged in an arrestor hook space delimited by the inner and outer side walls. The arrestor hooks can be operated by corresponding arrestor hook cylinders 46.

In the region of the first docking wall 39, bushing-shaped centring pin receptacles 47 (counter coupling elements) are provided which form the first centring device 36 of the docking receptacle 31. Then, the first docking wall 39 is provided in the insertion direction 34, which has two holes 48 to accommodate the bushing-shaped centring pin receptacles 47. The bushing-shaped centring pin receptacles 47 are arranged in the holes 48. The bushing-shaped centring pin receptacles 47 are arranged therefore, in the insertion direction 34 behind the first docking wall 39. The bushing-shaped centring pin receptacles 47 comprise, in the insertion direction 34, a tubular insertion/centring section 49 and a safety section 54. The tubular insertion/centring section 49 has a cone-shaped tapering insertion recess 50, wherein a vertical front face arranged against the insertion direction 34 protrudes from the first docking wall 39 and a first axial stop face 51 forms a first stop device 52. Radially surrounding and equally spaced apart from each other, dirt removal grooves 53 are formed in this circular first stop face 51 to accept and remove contaminants.

These types of contaminants would alter the position of the stop. This is disadvantageous to the extent that it would be impossible to have a precise coupling between docking receptacle and docking device. The tubular insertion/centring section 49 has a cylindrical centring recess 55 connecting to the insertion recess in the insertion direction 34. On a circular front face opposite the insertion direction 34, the tubular safety section 57 has holes 56 to connect to the first docking wall 39, for example, by means of corresponding screw fastenings. This front face has a greater diameter than the tubular insertion/centring section 49 and, because of this, forms a radially surrounding stop shoulder which prevents the bushing-shaped centring pin receptacle from shifting against the insertion direction 34. The advantage of this arrangement is that the longitudinal forces which are introduced on the one hand by accessory equipment and on the other hand by the wedge forces of the wedge forks are superimposed, do not have to be introduced by a screw connection into the docking receptacle.

Furthermore, grooves 58 extending in a vertical direction are present in the tubular safety section 57 to receive hydraulically operable wedge forks 59. The wedge forks 59 are provided for fixing a corresponding centring pin of a docking slot 32 and can slide in a vertical direction from a free position to a fixed position. The wedge forks 59 thus form an axial securing device 60. In the region between the two bushing-shaped centring pin receptacles 47, a drive shaft connecting device is provided approximately centrally in the first docking wall 39. A drive shaft connecting device 67 is a part of a drive shaft connecting device to connect one end of a drive shaft on a vehicle with one end of a drive shaft on accessory equipment.

A recess 66 is formed in the second docking wall 40 to accommodate a coupling plate to provide electrical, electronic, hydraulic and/or pneumatic connections between a vehicle and an accessory equipment item. The coupling plate with a flange-mounted valve block can be formed by very simply and quickly loosening just four screws for repair purposes opposite the insertion direction 34. Furthermore, two centring pins 61 extending against the insertion direction 34 (coupling elements) are provided in the region of the second docking wall 40 wherein said pins form the second centring device 37 of the docking receptacle 31. In the insertion direction 34, the centring pins 61 have a wedge-shaped insertion section 62 and a cylindrical centring section 63 connected to it. A circular vertical front face lying to the front in the insertion direction 34 and connected to the centring section 63 forms a second stop face 64 of a second stop device 65. The coupling elements and/or the counter coupling elements of the first and second centring device thus form at least two axial stop devices which delimit a relative movement between docking receptacle and docking slot in the insertion direction. The stops are formed preferably on the first and/or second centring pins and/or on the first and/or second centring recesses extending in a plane perpendicular to the insertion direction of circular stop faces.

A PTO shaft connecting device 68 is provided in the region between both centring pins 66 approximately centrally in the second docking wall 40. A PTO shaft connecting device 68 is a part of a PTO shaft connecting device to connect one end of a PTO shaft on a vehicle with one end of a PTO shaft on accessory equipment. The docking receptacle is positioned over a large (diameter approx. 258 mm), mechanically machined hole in the first plate at a centring attachment on a central pipe flange of a central axis piece. This precision makes it possible that, for the connection of the PTO drive of the gearbox and the PTO shaft connecting device, a connecting shaft with geared sockets can be used. With this system, it is unnecessary to have an expensive connection and certainly not a connection using a cardan joint which is not maintenance-free.

The docking slot 32 will be described below, using an example. The docking slot 32 is designed corresponding to the docking receptacle 31. The docking slot 32 firstly has a first docking wall 70 in the insertion direction 34. The first docking wall 70 extends substantially in a vertical direction and, on its underside, has a correspondingly designed lower wall 89 on the docking receptacle 31 for the insertion lead-in 35. Furthermore, a drive shaft connecting device is provided on the first docking wall 70 approximately in the centre. Corresponding to the centring pin receptacle 47 of the first centring device 36 of the docking receptacle 31, first centring pins 71 of a first centring device 72 of the docking slot 32 are formed on the first docking wall 70 of the docking slot 31 extending in the insertion direction 34.

In the insertion direction 34, the first centring pins 71 have a cylindrical centring section 73 and a conical insertion section 74 adjoining it. Furthermore, the first centring pins 71 have circular first stop faces 93 which form a first stop device 94 of the first centring device 72 against the insertion direction. In the cylindrical centring section 73, wedge fork receptacle grooves 74 are provided, extending in the vertical direction and formed in a convex shape and corresponding to the wedge forks 59.

An insertion body 75 is provided on the first docking wall, extending in the insertion direction for the arrangement in the receptacle space 43 of the docking receptacle 31. In the insertion direction at the front, the insertion body 75 has a second docking wall 76 extending in an approximate vertical direction. In the second docking wall, corresponding to the second centring pins 61 of the second centring device 37 of the docking receptacle 31, corresponding centring pin receptacles 77 of a second centring device 78 of the docking slot 32 are formed. The second docking wall 76 has two holes 80 to accommodate the bushing-shaped centring pin receptacles 77. The bushing-shaped centring pin receptacles 77 are arranged in the holes 80. In the insertion direction 34, the bushing-shaped centring pin receptacles 77 comprise a centring section 82 and an insertion section 81.

The tubular insertion section 81 has a tapering insertion recess 83 in a wedge shape, wherein a front face arranged against the insertion direction 34 protrudes from the second docking wall 76 and forms a second axial stop face 84 of a second stop device 85. In this circular second stop face 85, radially surrounding and uniformly spaced dirt removal grooves 86 are formed to receive and remove contaminants. The tubular centring section 82 has a cylindrical centring recess 87 connecting to the insertion recess 83 against the insertion direction 34. A PTO connecting device is arranged in the region between these centring pin recesses 77. A coupling plate receptacle is formed in the region in a vertical direction above the second centring device 78.

Furthermore, a PTO shaft 88 extending transversely to the insertion direction 34 is arranged on the insertion body 75. The ends of the shaft form capturing pins 89. These capturing pins 89 are grasped by the arrestor hooks 44 of the docking receptacle 31 with the insertion of the docking slot 32 into the docking receptacle 31 and then, by means of the hydraulically operated arrestor hooks 44 of the docking slot 32 are pulled into the docking receptacle 32, wherein a lower wall 90 of the insertion body 75 of the docking slot 32 slides correspondingly in the insertion lead-in 35 of the docking receptacle 31.

Besides an axial locking as a safety device 60, the hydraulic wedge forks still have a second locking device extending transversely to the insertion direction. The second locking device comprises a pneumatically operable safety body which fixes the wedge forks in the centring pin bushing. This second locking can happen only if the hydraulic wedge fork is correctly positioned. Accordingly, a sensor is provided in order to check the position of the hydraulic wedge fork. The advantage of wedge forks is that they are easy to automate. At this time, the wedge forks run in the wedge fork grooves.

According to an alternative embodiment, provision can be made that the centring devices or their centring elements (pins, bushings) are interchanged. In this case, it is simply of vital importance that both centring pins or centring recesses of the first and the second centring devices are designed such that all four components enable centring to be simultaneous since accessory equipment arranged on the docking slot is often very heavy and, as a result, it is necessary that the centring in the axial insertion direction is exact.

A coupling plate 100 is provided to form electrical, electronic, hydraulic and/or pneumatic connections. This coupling plate 100 comprises an approximately flat base plate 101. This base plate 101 can be provided with a plurality of electrical, electronic, hydraulic and/or pneumatic as well as mechanical connecting elements. At least two hydraulic coupling devices 113 are formed on the base plate 101. These two hydraulic coupling devices 113 are provided to operate almost all supporting foot cylinders present on almost all connectable modules.

Furthermore, at least one electronic connection device 102 is provided on the base plate 101 to provide an electronic connection between a control device of a vehicle and a control device of accessory equipment. This electronic connection serves to identify the type of module, or type of trailer or type of accessory equipment. Furthermore, at least one electrical connection device 103 is arranged on the base plate 101. This electrical connection device is provided to operate a light (e.g. braking, front, rear, positional or warning light) on the attached module. Also, there are two electrical control contacts 104, which are connected together electrically by coupling the docking slot 32 with the docking receptacle 31, to detect whether the docking slot 32 is inserted completely into the docking receptacle 31 and a securing and/or locking device can be activated.

Alongside the minimum connecting devices described above, the coupling plate has a centring device 105. This centring device 105 comprises, if the coupling plate 100 is provided for the docking receptacle 31, at least two centring pins 106, wherein the corresponding centring recesses 107 are designed to correspond to a coupling plate of the docking slot 32. The centring device comprises at least two coupling (centring pins 106) and/or counter coupling elements (centring recess 107). Furthermore, three connecting holes 108 are provided in a coupling plate 100 to connect the coupling plate 100 with a docking slot 32 or a docking receptacle 31.

Tubular plastic bushings 109 or rubber bearings (preferably of the docking slot 32) are provided in these connecting holes 108, and are produced from an elastic material to provide a small amount of clearance in the transverse direction and, by doing so, to increase the precision when connecting two coupling plates. Fixing means 111, such as screws, can be arranged in corresponding recesses 110 of the plastic bushings 109 in order to attach the coupling plate 100 to a coupling device, such as a docking slot 32 or a docking receptacle. The plastic bushings 109 form a positioning device 112 when combined with the fixing means 111. Pneumatic connection devices 114 are also provided in the base plate 101. Features of the coupling plate are described below in more detail.

A coupling plate 100 fitted to a vehicle comprises the approximately flat base plate 101, on which are incorporated, on the attachment, electrical connection devices 103 and/or electronic connection devices 102, such as electric plugs 102, hydraulic connection equipment 113, such as hydraulic connection devices 113, and pneumatic connection devices 114, such as compressed air couplings, as well as centring pins 106 for finely centring the coupling plate on the attachment. A valve block 115 with up to six double-acting hydraulic control devices (not shown) is flange-mounted on the vehicle.

The coupling plate 100 is hydraulically designed such that only the pressure tank and load information lines are connected for the working hydraulics. The line between these main connections and the couplings of a power-beyond system as well as the supply of the valve block 115 are incorporated in the base plate 101. The base plate 101 is screwed solidly by attachment means 111 to a docking receptacle 31 on the vehicle. The coupling plate 100 on the docking slot on the attached device comprises the corresponding opposing plug and couplings and is connected solidly by means of the positioning device 112 or the plastic bushings 109 and the attachment means 111 to a docking slot 32.

The positioning device 112 is designed, therefore, to provide a slight clearance for the coupling plate in a vertical or a horizontal plane (transverse direction) in relation to a coupling device. This enables the coupling plate 100 to centre itself finely by means of the plastic bushings 109 or rubber bushings and the holes provided for the purpose in relation to the centring pins 106 on the vehicle in order to achieve a precise alignment in the region of 0.05 mm required for the hydraulic coupling. In the joining of two coupling plates 100 is achieved by coupling a docking slot 32 with a docking receptacle 31.

In the attachment of two coupling plates 100 according to the invention, provision is made accordingly that the centring pins 106 of a coupling plate 100 connected with a docking receptacle 31 penetrate into the corresponding centring recesses 105 of a coupling plate connected according to the invention with a docking slot 32 and, in this manner, both coupling plates 100 in particular align exactly with each other in a vertical connecting plane. In this manner, all electrical, electronic, hydraulic and/or pneumatic connections provided on the docking slot 32 and docking receptacle 31 are connected to each other.

A description is given below of a method of docking, or an insertion of the docking slot in the docking receptacle or a method of connecting a docking slot according to the invention with a docking receptacle. First, the insertion body 75 of the docking slot is arranged in the region of the receptacle space 43 of the docking receptacle 31, preferably by operating the vehicle and therefore the docking receptacle 31 arranged on it. By doing so, the docking slot is pre-centred in the docking receptacle due to the sliding of the lower or insertion wall 90 of the docking slot 32 in the insertion lead-in 35 of the docking receptacle 31. After a relative movement in the insertion direction for a predetermined distance has happened, the arrestor hooks 44 of the docking receptacle are actuated by means of the arrestor hook cylinder 46, after which it is lowered down in a vertical direction so that capturing recesses 69 of the arrestor hooks 44 engage with the capturing pins 89 of the docking slot. Next, the movement of the docking slot in the docking receptacle takes place by the movement of the vehicle. By so doing, pre-centring takes place. Then, the arrestor hooks snap in and pull the docking slot in the insertion direction into the docking receptacle.

Two rollers which can swivel in the docking receptacle form a slotted guide system with a slot in the arrestor hooks and a track on the upper side of the arrestor hook. This slotted guide system works in such a way that the arrestor hooks firstly move, when moving out, in the longitudinal direction of the vehicle and then move upwards. This produces an opening in which the capturing pins are inserted when entering into the docking slot. As the arrestor hooks are pulling, the hooks move downwards initially and interlock with the capturing pins. Then, the docking slot is drawn in.

Next, the capturing pins slide along a catch pin guide 45 in the inner side walls 41 of the docking receptacle 31, wherein the capturing pins 89 are arranged in the catch pin guide 45 with just a small amount of clearance. Subsequently, by moving the docking slot 31 in the insertion direction 34, further centring of the docking slot 32 takes place in the docking receptacle 31 by means of the first and second centring devices 36, 37, 72, 78 of the docking receptacle 31 and of the docking slot 32 along the four centring axes 38. In this process, the two centring pins 71 of the first centring device 72 of the docking slot 32 with their insertion sections 74 slide into the wedge-shaped insertion openings 50 of the two centring pin receptacles 47 of the first centring device 36 of the docking receptacle 31. At the same time, the conical faces of the insertion sections 62 of the centring pins 61 of the second centring device 37 the docking receptacle 31 slide into the insertion recesses 83 of the centring pin receptacles 77 of the second centring device 78 of the docking slot.

Next, a further fine centring of the docking slot 32 in the docking receptacle 31 is done by a further movement of the docking slot 31 in the insertion direction 34. In this process, the two centring pins 71 of the first centring device 72 of the docking slot 32 slide with their cylindrical centring sections 73 into the cylindrical centring recesses 55 of the two centring pin receptacles 47 of the first centring device 36 of the docking receptacle 31. Simultaneously, the cylindrical centring sections 63 of the centring pins 61 of the second centring device 37 of the docking receptacle 31 slide into the centring recesses 87 of the centring pin receptacles 77 of the second centring device 78 of the docking slot. The movement of the docking slot 32 in the insertion direction 34 towards the docking receptacle 31 is delimited by the first stop faces 51, 93 of the first stop devices 52, 94 of the first centring device 36, 72.

Furthermore, the movement of the docking slot 32 in the insertion direction 34 towards the docking receptacle 31 is delimited by the second stop faces 64, 84 of the second stop devices 65, 85 of the first centring device 36, 72. As soon as the stop faces 51, 93 of the first stop devices 52, 94 and the stop faces 64, 84 of the second stop device 65, 85 line up, the insertion of the docking slot 32 in the docking receptacle 31 is delimited in the axial direction. The docking slot 32 is now fully inserted into the docking receptacle 31. Preferably electrical contacts (not shown) are provided both on the docking slot 32 as well as on the docking receptacle 31, which contact each other as soon as the docking process has finished. A signal generated in this way is used to move the actuating cylinder 95 of the hydraulically operable wedge forks 59 downwards in a vertical direction such that the prongs of the wedge forks 59 engage in the grooves 58 of the securing section 57 of the first centring pins 71 of the first centring device 72 of the docking slot and in addition to the arrestor hooks 44, prevent the uncoupling of the docking slot 32 from the docking receptacle 31.

To secure the wedge forks, a pneumatically operable locking device 91 is provided which inserts corresponding locking pins 96 through locking holes 97 formed in the securing section 57 and in the forks of the wedge fork 59 and in this manner fix and secure the position of the wedge forks 59. Simultaneously, if necessary, PTO connecting devices and/or driveshaft connecting devices of the docking receptacle 31 and of the docking slot 32 are connected together in this final position.

REFERENCE LIST

30 Docking device
31 Docking receptacle
32 Docking slot
33 Pre-centring device
34 Insertion direction
35 Insertion lead-in
36 First centring device
37 Second centring device
38 Centring axes
39 First docking wall
50 Second docking wall
41 Inner side wall
42 Outer side wall
43 Receiving space
44 Arrestor hook
45 Catch pin guide
46 Arrestor hook cylinder
47 Centring pin receptacle
48 Hole
49 Insertion/centring section
50 Cone-shaped insertion opening
51 First axial stop face
52 First stop device
53 Dirt removal grooves
54 Tubular centring section
55 Cylindrical centring recess
56 Hole
57 Securing section
58 Grooves
59 Wedge fork
60 Axial securing device
61 Centring pins
62 Insertion section
63 Centring section
64 Second stop face
65 Second stop device
66 Recess
67 Drive shaft connecting device
68 PTO connecting device
69 Capturing recesses
70 First docking wall
71 First centring pins
72 First centring device
73 Cylindrical centring section
74 Wedge fork receptacle groove
75 Insertion body
76 Second docking wall
77 Centring pin receptacle
78 Second centring device
79 Coupling plate receptacle
80 Hole
81 Securing section
82 Centring section
83 Insertion recess
84 Second stop face
85 Second stop device
86 Dirt removal groove
87 Centring recess
88 Capturing pin shaft
89 Capturing pin
90 Lower wall
91 Locking device
92 Wedge fork receiving groove
93 First stop face
94 First stop device
95 Actuating cylinder wedge fork
96 Locking pin
97 Locking hole
100 Coupling plate
101 Base plate
102 Electronic connecting device
103 Electrical connecting device
104 Electrical control contact
105 Centring device
106 Centring pin
107 Centring recess
108 Connecting hole
109 Plastic bushing
110 Recess
111 Fastener
112 Positioning device
113 Hydraulic connecting device
114 Pneumatic connecting device
115 Valve block
150 PTO connecting device
151 Vehicle PTO connecting device
152 Attachment PTO connecting device
153 Coupling shaft
154 Bearing shaft
155 Spacer shaft
156 Vehicle end spacer shaft
157 Connecting region
158 Cover wall 159 Cover wall
160 Outer gear teeth
161 Outer gear teeth
162 Bushing
163 Inner gear teeth
164 Retaining ring
165 Coupling end
166 Front face
167 Centering pin
168 Vehicle end
169 Centring recess
170 Bearing seat
171 Bearing end
172 Vehicle end
173 Stop plate
174 Disc spring washer
175 Screw fastener
176 Inner gear teeth
177 Coupling hub
178 bearing seat
179 Vehicle end coupling shaft
180 Recess
181 Outer gear teeth
182 Inner gear teeth coupling shaft
183 Shoulder
184 Bearing device
185 Axial stop
186 Disc spring washer
187 Coupling end
188 Cup-shaped receptacle
189 Inner gear teeth coupling hub
190 Outer gear teeth coupling hub

The invention claimed is:

1. A power take off (PTO) connecting apparatus to couple a PTO drive of a vehicle with a PTO drive of accessory equipment, wherein a vehicle PTO connecting device with a releasable nonpositively connectable and couplable attachment PTO connecting device are present wherein mechanical coupling elements are provided on the vehicle and mechanical counter coupling elements are provided on the accessory equipment with the coupling elements of the vehicle configured to slide into the coupling elements of the accessory equipment and interlock,
wherein the vehicle PTO connecting device and the attachment PTO connecting device are each secured axially to the vehicle or to the accessory equipment, or, respectively, the coupling unit of the vehicle and the coupling unit of the attachment, so that, when the vehicle and the accessory equipment are mechanically attached, the PTO connecting devices must necessarily be coupled together,
wherein the vehicle PTO connecting device (151) comprises a coupling shaft (153), a bearing shaft (154) connected to the coupling shaft (153), and a bearing seat, wherein the coupling shaft (153) has outer gear teeth designed with flank clearance designed on one coupling side, and wherein the bearing shaft (154) can swivel by means of a bearing device and an approximately circular shoulder is formed in the bearing seat forming an axial stop for the coupling shaft (153) wherein the bearing seat has a stop plate at a vehicle end, and a vehicle end of the coupling shaft (153), has a cup-shaped recess with inner gear teeth and has, on a coupling end of the bearing shaft, correspondingly designed outer gear teeth to form an anti-rotational lock and wherein coupling shaft and bearing shaft (154) are connected together by means of screw fastenings.

2. The PTO connecting apparatus of claim 1, wherein the PTO connecting apparatus comprises a coupling shaft (153) with a coupling side, which comprises outer gear teeth designed with flank clearance and additionally a coupling hub (177) as a corresponding PTO connecting device (152) which has inner gear teeth designed with flank clearance on a coupling side, and is designed to correspond to the outer gear teeth of the coupling shaft (153).

3. The PTO connecting apparatus of claim 2, wherein the outer gear teeth of the coupling shaft (153) and the inner gear teeth of the coupling hub (177) are designed such that the tooth systems, or teeth at the coupling front faces come into contact axially or are designed with sharply angled converging flanks so that the teeth each form locating channels for the corresponding gearing so that inner gear teeth, or outer gear teeth, can slide along on the sloping flanks or chamfering during coupling so that the gears rotate into each other and are able to slide with respect to each other.

4. The PTO connecting apparatus of claim 1, wherein the attachment PTO connecting device (152) comprises a designed coupling hub (177) and a bearing seat (178), wherein the coupling hub (177) has internal gear teeth (189) on a coupling side designed with flank clearance wherein said hub is designed corresponding to the outer gear teeth of a coupling shaft (153), and wherein the coupling hub (177) on the attachment has a cylindrical bearing section which is able to swivel in the bearing seat (178) by means of a bearing device and an approximately circular shoulder is formed in the bearing seat (178), forming an axial stop for the coupling hub (177) wherein the bearing seat has a stop wall at one end of the attachment.

5. The PTO connecting apparatus of claim 1, wherein at least one disc spring washer is arranged between a bearing device and a stop wall.

6. The PTO connecting apparatus of claim 4, wherein a spacer shaft (156) is provided which can be connected to the bearing shaft (154) wherein the spacer shaft (156) and the bearing shaft (154) have outer gear teeth (160, 161) in a connecting region on their respective cover wall (158, 159), and wherein, in the area of these sets of gear teeth, a correspondingly designed tubular sleeve (162) is provided which has corresponding inner gear teeth (163), and connects the bearing shaft (154) with the spacer shaft (155).

7. The PTO connecting apparatus of claim 5, wherein a vehicle end of a spacer shaft (156) can be connected via a PTO coupling to a vehicle gearbox.

8. The PTO connecting apparatus of claim 1, wherein a connecting sleeve (162) is connected by means of corresponding retaining rings (164) against axial shifting or sliding, both with a bearing shaft (154) as well as with a spacer shaft (155).

9. The PTO connecting apparatus of claim 1, wherein a spacer shaft (155) includes a front face (166) with a centring pin (167) extending in a longitudinal direction on its coupling or connecting end (165), wherein a bearing shaft (154) has a correspondingly designed centring recess (169) corresponding to a vehicle end (168).

10. The PTO connecting apparatus of claim 1, wherein in a docking receptacle (31), in order to couple an agricultural vehicle and an attachment by means of the docking receptacle (31) and of a corresponding docking slot in the docking receptacle (31), a corresponding bearing seat (170) is provided to mount a bearing shaft (154), wherein the bearing seat is a component part of the vehicle PTO connecting device (151) and is connected unreleasably to the docking receptacle (31) by welded joints or releasably connected, but fastened by corresponding screw fasteners.

11. The PTO connecting apparatus of claim 1, wherein a bearing shaft (154) is accommodated and mounted in a bearing seat (170) by means of a bearing device (171), including a ball bearing.

12. The PTO connecting apparatus of claim 1, wherein at its a vehicle end (172), the bearing seat (170) has a stop plate (173), wherein a bearing device (171) is mounted on the stop plate (173) by corresponding disc spring washers (174), wherein the disc spring washers (174) are designed to protect the bearing device (171) from wear and damage during the process of coupling two PTO shafts.

13. The PTO connecting apparatus of claim 1, wherein the bearing shaft (154) is connected to the cup-shaped coupling shaft (153), wherein a coupling shaft (153) is secured axially and connected by a central screw fastening (175) with the connecting end (165) of the bearing shaft (154), wherein this securing device has a clearance in the axial as well as the radial direction which is larger than the flank clearance of a gear in the corresponding spline, wherein the coupling shaft (153) has a corresponding set of inner gear teeth (176).

14. The PTO connecting apparatus of claim 1, wherein on its vehicle end (179), the coupling shaft (153) has a recess (80) in which the bearing shaft (154) is mounted, wherein, to make a connection, in this region the bearing shaft (154) has a corresponding set of outer gear teeth (181) and the coupling shaft has a correspondingly designed set of inner gear teeth (182).

15. The PTO connecting apparatus of claim 1, wherein the coupling shaft (173) forms a connection or coupling with a cup-shaped coupling hub (177) on the PTO connecting device (152) of the accessory equipment.

16. The PTO connecting apparatus of claim 1, wherein the coupling shaft (153) and a coupling hub (177) is axially located in a corresponding bearing seat (178) in a docking slot (32) of the attachment.

17. The PTO connecting apparatus of claim 1, wherein at the coupling end, the coupling shaft (153) has corresponding outer gear teeth (190), to connect the coupling shaft (153) with the inner gear teeth of a coupling hub (177) wherein radially surrounding shoulder (183) of the coupling shaft (153) forms a stop which is housed in the bearing seat (170) of a docking receptacle.

18. The PTO connecting apparatus of claim 1, wherein a coupling hub (177) is mounted to swivel in the bearing seat (178) of the attachment PTO connecting device (152) by means of a bearing device (184), including a ball bearing, wherein the bearing seat (178) forms an axial stop (185) of the coupling hub, wherein in the bearing seat (178) in the region between the bearing device (184) and the bearing seat (178), disc spring washers (186) are provided in order to protect the bearing device (184) from damage, wherein, at its connecting or coupling end (187) the coupling hub (177) has a cup-shaped receptacle (188) with inner gear teeth (189) to receive the outer gear teeth (190) of the coupling shaft (153).

19. A method for producing a PTO coupling between a vehicle having a PTO and the shaft of an attachment or of an auxiliary axle to be connected, wherein the vehicle and the attachment and/or the auxiliary axle have docking devices which correspond to each other, and interact to produce a mechanical connection, wherein the vehicle has a docking receptacle and the attachment has a docking slot, or vice versa, wherein the docking slot is pulled in with into the docking receptacle, wherein a coupling hub slides axially along the coupling shaft, corresponding to the insertion movement, which is performed with the hydraulic collecting or arrestor hooks, wherein the teeth with their flanks converging on the coupling side slide over each other on the coupling shaft and on the coupling hub during the insertion movement along the flanks of their teeth, thereby rotating the shafts into the couplable position and the coupling hub slides over the coupling shaft.

\* \* \* \* \*